UNITED STATES PATENT OFFICE.

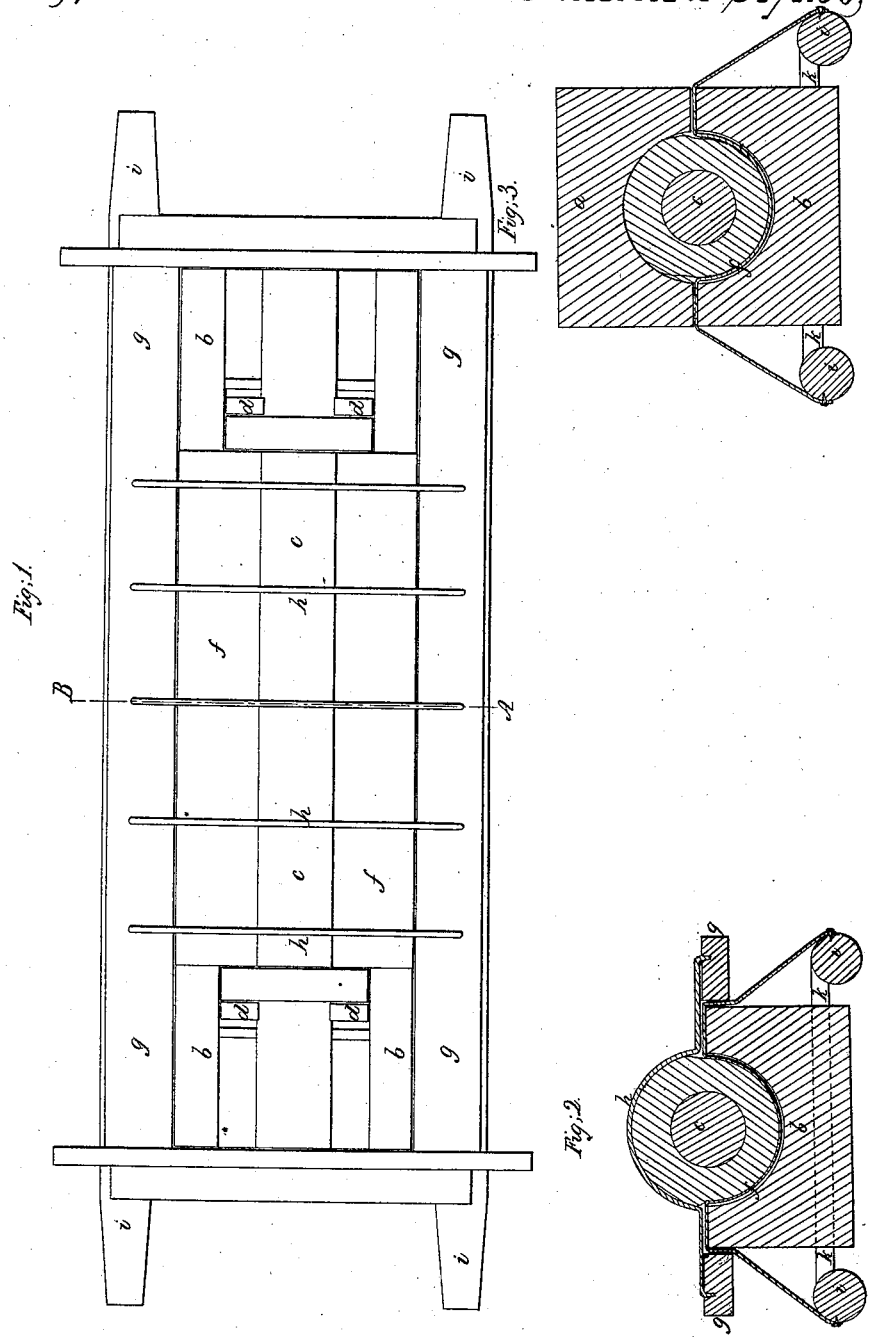

JOSEPH PUTNAM, OF SALEM, MASSACHUSETTS.

IMPROVEMENT IN THE MANUFACTURE OF CLAY PIPES.

Specification forming part of Letters Patent No. 8,403, dated September 30, 1851.

*To all whom it may concern:*

Be it known that I, JOSEPH PUTNAM, of Salem, in the county of Essex and State of Massachusetts, have invented certain new and useful Improvements in the Manufacture of Clay Pipes for Water, Gas, &c.; and I do hereby declare that the following description, taken in connection with the accompanying drawings, hereinafter referred to, forms a full and exact specification of the same, wherein I have set forth the nature and principles of my said improvements, by which my invention may be distinguished from all others for a similar purpose, together with such parts as I claim and desire to have secured to me by Letters Patent.

My improvements are made upon an apparatus for the same or a similar purpose, for which Letters Patent were granted to me, dated January 17, A. D. 1827, and recorded anew in the Patent Office on the 12th day of February, A. D. 1838, to which patent reference should be had, and are represented in the figures of the accompanying plate of drawings, of which—

Figure 1 is a top view of the apparatus with a wire gage-frame, hereinafter described, in proper position and the upper half of the mold removed. Fig. 2 is a transverse vertical section of the same, taken in the plane of the line A B, Fig. 1; and Fig. 3 is a similar section with the upper half of the mold in position.

The main features of my apparatus as first patented consisted of a mold in two parts, similar to that shown at $a\ a\ b\ b$ in the drawings, having one-half the bore in each part, necessary to give the requisite diameter of the entire pipe. A mandrel $c\ c$ is set in proper collars on supports $d\ d$, and a copper casing in two parts connected by a cloth covering fitting about said mandrel closely and so as to permit the same to be easily withdrawn after the pipe is molded; but this casing I do not find indispensably necessary in the operation of making pipes. I also used a sack laid in the bottom of the lower half of the mold, so as to remove the pipe therefrom after molding it and suspend it for the purpose of drying it, as shown at $f\ f$ in the drawings.

The working of this apparatus consisted in packing the clay about the mandrel when in position in the lower half of the mold, as aforesaid, and placing the upper half of said mold in position and applying pressure thereon, so as to condense the clay about the mandrel and within the mold; but by condensing a redundant quantity of moist clay in this manner the water suspended therein and which frequently collects about the mandrel would press out from the same to the exterior of the pipe, making a hole in its passage, which would frequently remain after drying and burning the pipe in the kiln, and thereby render the same useless. This difficulty I obviate by giving the pipe its form after filling the clay in the lower half $b\ b$ of the mold by means of a wire gage-frame, before referred to. This frame is of the rectangular shape, as shown at $g\ g\ g\ g$ in Figs. 1 and 2, having a series of transverse wires $h\ h\ h$, set at proper intervals apart, extending from one side rail of said frame to the other and fastened therein and bent into a circular form at the center, so as to give the proper diameter to the exterior of the pipe. By placing this gage-frame in the proper position after the clay is placed about the mandrel and removing the redundant clay, and then removing said frame and applying the upper half of the mold so as to give the proper finish to the pipes, they will be found, after being dried, burnt, &c., to be very perfect in the bore and without any such imperfection as I have above referred to.

The arrangement of the sack I have also improved. As described in the patent above referred to, it was formed with loops on its exterior edges, into which poles were inserted after the pipe was molded, and by which it was removed from the mold and hung up to dry before being burnt. Unless the poles in so removing the pipes were kept perfectly parallel, the pipes were liable to be bent and be made imperfect. This difficulty I remedy by suspending the sacking between the two side rails $i\ i\ i\ i$ of the horizontal frame $i\ i\ k\ i\ i\ k$, which rails are kept exactly parallel by the cross-bars $k\ k$, and therefore in removing the pipe on a sack so arranged it will be uniformly supported and kept in an exactly straight line on the same, which is of great practical importance.

In my improved apparatus the pipes are made entirely cylindrical and without any enlargement at the ends, the ends of two adjacent pipes being fastened by suitable couplings.

Having thus described my improvements in apparatus for molding clay pipes, I shall state my claims as follows.

What I claim as my invention, and desire to have secured to me by Letters Patent, is—

1. The use of the wire gage-frame, constructed substantially as above described, in molding clay or earthen pipes in the manner and for the purpose above specified.

2. The improvement above specified in the sack in which said pipes are suspended to be dried, said improvement consisting in confining said sack to two rails kept parallel by means of cross-bars forming with them a rectangular frame, as hereinabove described.

JOSEPH PUTNAM.

Witnetses:
EZRA LINCOLN,
ROBERT L. HARRIS.